United States Patent [19]

Karl et al.

[11] Patent Number: 4,970,450
[45] Date of Patent: Nov. 13, 1990

[54] DERIVING ROTATIONAL RATE AND ANGULAR POSITION WITH A FUNCTION GENERATOR

[75] Inventors: Heinz-Dietmar Karl; Manfred Tinebor, both of Barntrup; Jürgen Krietemeier, Aerzen, all of Fed. Rep. of Germany

[73] Assignee: Lenze GmbH & Co KG Aerzen, Aerzen, Fed. Rep. of Germany

[21] Appl. No.: 416,868

[22] Filed: Oct. 4, 1989

[30] Foreign Application Priority Data

Oct. 10, 1988 [DE] Fed. Rep. of Germany ....... 3834384

[51] Int. Cl.$^5$ .......................... G05B 1/03; G01B 7/30; G01P 3/44
[52] U.S. Cl. .................................. 318/654; 318/603; 318/608; 318/660
[58] Field of Search .................................. 318/560–661; 340/347 SY, 347 M; 324/253, 254; 364/183

[56] References Cited

U.S. PATENT DOCUMENTS

| | | |
|---|---|---|
| 3,710,223 | 1/1973 | Cottrell ........................... 318/654 X |
| 4,011,440 | 3/1977 | Steglich ........................... 318/654 X |
| 4,272,818 | 6/1981 | McDaniel ........................ 318/608 X |
| 4,472,669 | 9/1984 | Denham et al. ..................... 318/661 |
| 4,475,105 | 10/1984 | Kurosawa ........................ 318/608 X |
| 4,511,884 | 4/1985 | Serev et al. ...................... 318/660 X |
| 4,556,885 | 12/1985 | Kurosawa ........................ 318/608 X |
| 4,843,291 | 6/1989 | Predina ........................... 318/603 X |

Primary Examiner—William M. Shoop, Jr.
Assistant Examiner—Paul Ip
Attorney, Agent, or Firm—Charles E. Baxley

[57] ABSTRACT

Angular position and rotation rate of a function generator having stator windings and rotor windings are determined by first amplitude modulating a carrier oscillation to form a sine signal and a cosine signal and then feeding the sine signal and cosine signals to opposite stator windings and thereby inducing in the rotor winding an analog function-generator signal. In turn this analog function-generator signal is converted into a digital function-generator signal from which is derived by means of an algorithm a digital rotation-rate signal which is numerically integrated to obtain an angular-position signal. This angular-position signal is itself used to modulate the carrier oscillation.

3 Claims, 3 Drawing Sheets

DERIVING ROTATIONAL RATE AND ANGULAR POSITION WITH A FUNCTION GENERATOR

FIELD OF THE INVENTION

The present invention relates to a method of and circuit for deriving digital rotational-rate and angular-position information. More particularly this invention concerns deriving such information using a function generator.

BACKGROUND OF THE INVENTION

It is known to derive digital rotational-rate and angular-position data from a function generator, a synchro or resolver, by the amplitude method. In this system a carrier oscillation is amplitude modulated with respect to sine and cosine and the thus formed sine and cosine signals are fed to the opposite stator windings of the function generator. This creates in the rotor winding of the generator a signal from which it is possible by amplitude analysis to derive the angular-position information.

A function generator like a resolver or synchro is a robust signal generator by means of which it is possible to obtain rotary-position as well as rotation-rate information. There are basically two procedures for doing this. In one system the Doppler effect is used by analyzing the phase and/or frequency of the signal. The Doppler-effect method consists in the addition of a reference frequency to the rotor frequency of the function generator. The frequency differential between the reference frequency and the signal of the generator is used to determine the rotation rate. The phase shift between the generator signal and the reference signal is used to derive the angular position of the rotor. A disadvantage of this phase-type determination of the angular position is that it is dependent on the temperature of the time-constant elements of the function generator so that the phase might be off somewhat. In addition this system is very sensitive to outside influences so that very short connection lines must be used.

In the other known system the angular-position information is derived from an amplitude analysis of the generator signal, through the use of interference. This system of the invention is described in U.S. Pat. No. 3,720,866 and German patent document No. 3,619,285. The amplitude-type evaluation of the generator signal is not weighted with the above-given disadvantages. With the known amplitude-type method it is only, however, possible to derive the angular-position information from the amplitude relationship of the sine- and cosine-modulated carrier-frequency signal.

According to the system of U.S. Pat. No. 3,720,866 the angular position of a synchro can be determined with sufficient resolution and accuracy by means of a digital processor. It is, however, only limitedly possible to derive information about the rotation rate. This can be done for example by means of the following example:

With an angular resolution of 14 bits (16,384 angular steps per revolution) and a maximum rotation rate is 3000 rev/min, the smallest measuring dead time is 0.1 msec. Thus the frequency or count of the angular steps per second is equal to:

$$f = (3000 \cdot 16{,}384)/60 \text{ sec} = 819{,}200 \text{ Hz},$$

and the number of angular steps for each dead time is $$z = f \cdot T_t = 8192 \text{ kHz} \cdot 0.1 \text{ msec} = 81.92.$$

As a result at maximum speed of the generator the angle changes in spite of the high angular resolution only by about 82 steps per idle time. There must be at least one angular step per dead time for fine rotation-rate resolution, giving the following smallest rate resolution:

$$n_{min} = n_{max}/z = 3000 \text{ min}^{-1}/81.92 = 36.6/\text{min}.$$

The attainable rotation-rate range of 82 is not attainable by present-day servo systems. In order to get to higher ranges, the dead time must be correspondingly lengthened. This is however only possible by limiting the dynamics of the drive regulation and the operation at low speeds. For a very fast-acting servo drive it is therefore impossible to increase the dead time. According to the above-cited German patent document a good analog rotation-rate signal is obtained with a resolver. If a digital signal is to be derived from this analog signal by means of an analog/digital converter, there will be offset and drift problems in the speed control range and accuracy will suffer.

OBJECTS OF THE INVENTION

It is therefore an object of the present invention to provide an improved system for deriving digital rotation-rate and angular-position data using a function generator.

Another object is the provision of such an improved system for deriving digital rotation-rate an angular-position data using a function generator which overcomes the above-given disadvantages, that is which produces a highly accurate and offsetless rotation-rate word or signal within a very short measuring time.

SUMMARY OF THE INVENTION

The method of determining angular position and rotation rate of a function generator having stator windings and rotor windings according to this invention comprises the steps of first amplitude modulating a carrier oscillation to form a sine signal and a cosine signal and then feeding the sine signal and cosine signals to opposite stator windings and thereby inducing in the rotor winding an analog function-generator signal. In turn this analog function-generator signal is converted into a digital function-generator signal from which is derived by means of an algorithm a digital rotation-rate signal which is numerically integrated to obtain an angular-position signal. This angular-position signal is itself used to modulate the carrier oscillation.

These steps according to this invention are all carried out by a microprocessor or microcontroller having a constant memory set for the generator in question.

The particular advantage of the invention is that one immediately converts the function-generator signal into a digital signal from which angular-position information is readily obtainable. Thus the digital rotation-rate information is not obtained from the digital angular-position information because even the information content at very high angular resolution is not sufficient to obtain rotation information at high resolution with a short measuring cycle. The invention thus goes around the problem and obtains from the function-generator signal in a short measuring time a high-resolution and offsetless rotation-rate signal.

DESCRIPTION OF THE DRAWING

The above and other objects, features, and advantages will become more readily apparent from the following, reference being made to the accompanying drawing in which.

SPECIFIC DESCRIPTION

Figure 1:
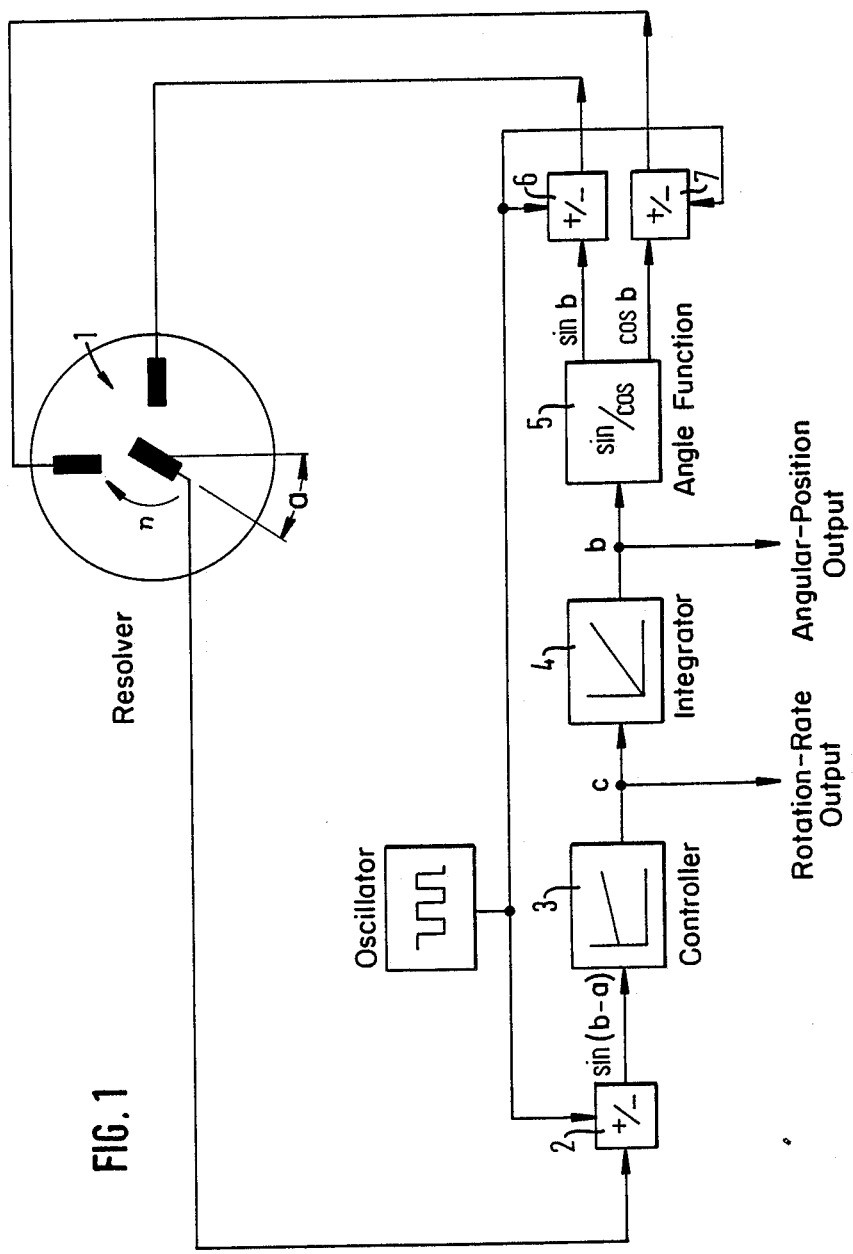
FIG. 1 is a diagram illustrating the signal processing of a function generator of the resolver type.

FIG. 1 shows a control arrangement with a resolver 1 having electrically 90° offset stator windings and a rotor winding connected together in a controlled circuit. The stator windings of the resolver 1 are fed by an angular-function member 5 with a sine signal and a cosine signal that are derived from an angular signal. Modulation units 6 and 7 periodically convert the sine and cosine signals with a square-wave carrier oscillation which is generated by an oscillator. As a result of the mechanically and electrically offset arrangement of the resolver windings the rotor winding of the resolver 1 produces a function-generator signal which corresponds to the sine of the angular difference between the angle b in the element 5 and the mechanical angle a of the resolver 1.

Since the function generator signal is at first combined with the carrier frequency, it is first demodulated in a demodulator 2 by polarity reversal. The signal sin (b−a) in the demodulator is applied to the input of a controller 3 whose function is to make the signal sin (b−a) tend to 0, so that the anglular rotation c equals the mechanical rotation angle a.

The angle b is formed in an integrator 4 which is connected to the output c of the controller 3 so that the angle b is formed by integration of the controller output c. The mechanical rotation a alone corresponds to the integral of the mechanical rotation n of the resolver 1, so that the controller output c corresponds to the output c of the controller 3. In the same manner the signal b can be taken from the output of the integrator 4.

Figure 2:
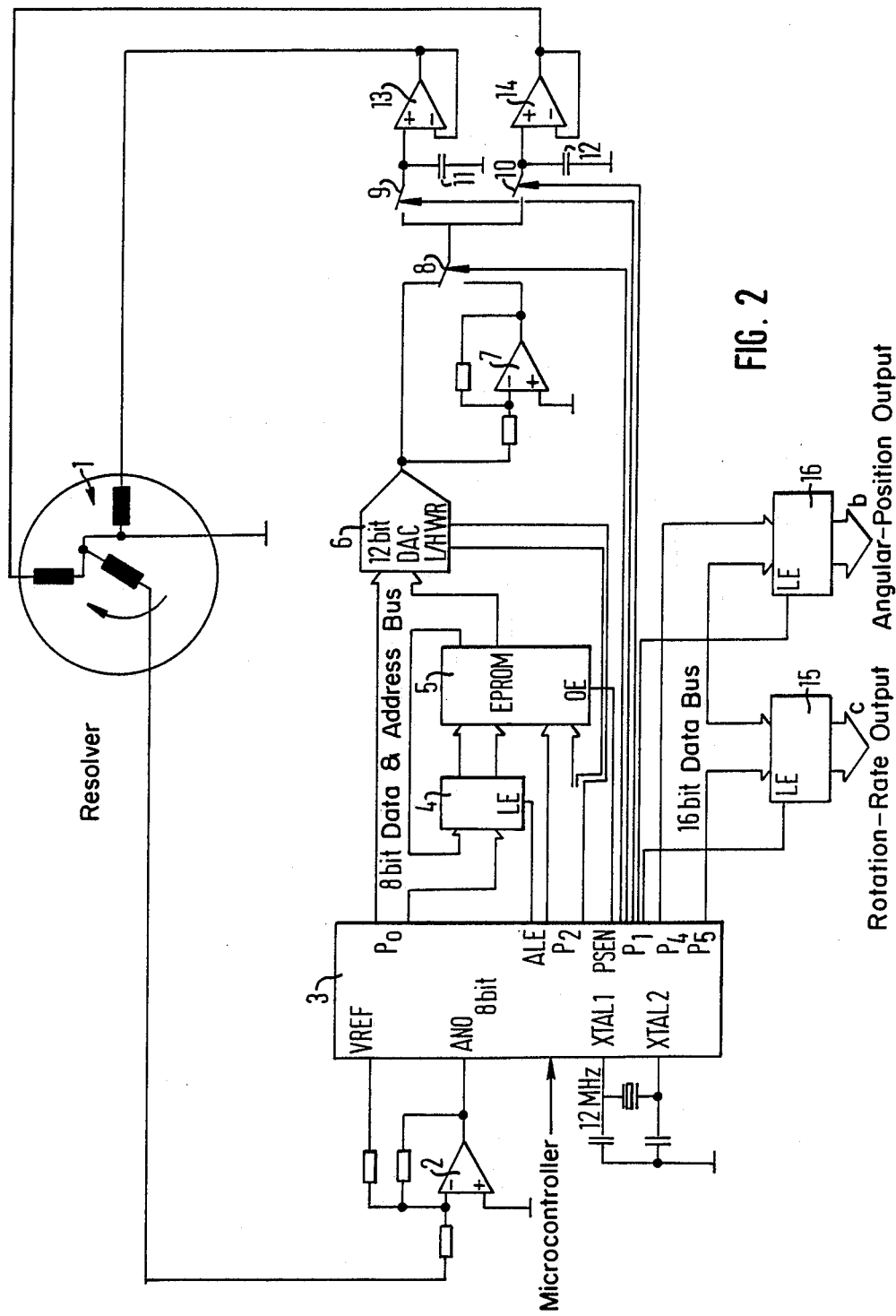
FIG. 2 is a diagram illustrating the data flow for the signal processing of a resolver using a microcontroller.

FIG. 2 shows a circuit by means of which the above-described regulation can be carried out. The function-generator signal received from the rotor winding of the resolver 1 is delivered via an amplifier 2 to an analog/digital convertor input ANO of a microprocessor 3. This processor 3 calculates by means of a control algorithm a rotation-rate word or signal c what is outputted via an intermediate memory 15. By integration of the word c representing the rotation rate the anglular position b is calculated and outputted via an intermediate memory 16. The microprocessor 3 takes out of a program and data memory 5 the sine and cosine of the angle b and passes it serially to a digital/analog converto4 6. The sine and cosine are fed for the duration of a carrier frequency oscillation in analog fashion to the condensers 11 and 12. The carrier frequency is modulated by sign reversal by the processor 3. The modulated sine and cosine signals are passed via amplifiers 13 and 14 to the stator winding of the resolver 1.

Figure 3:
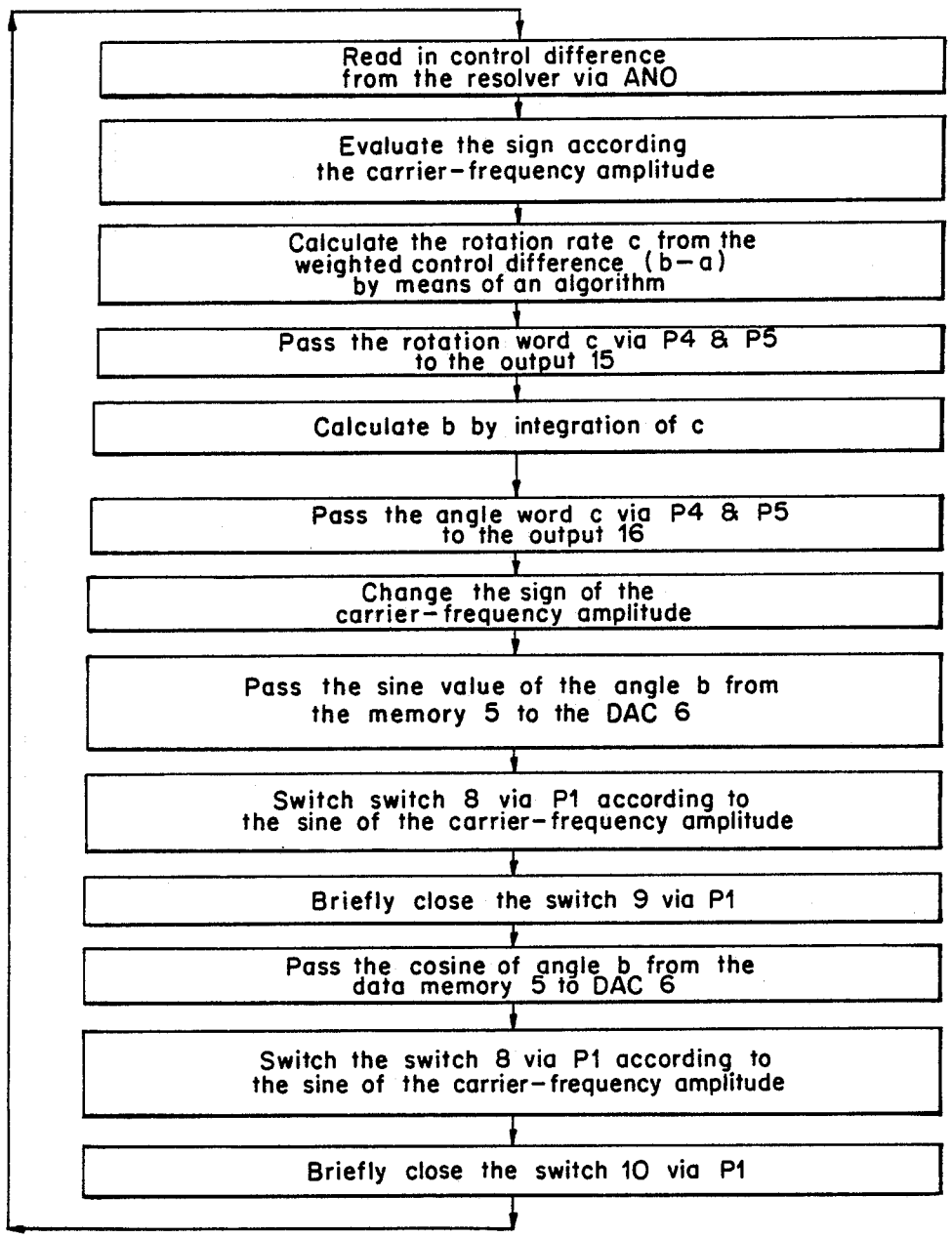
FIG. 3 is a chart showing the program of the microcontroller of FIG. 2.

FIG. 3 shows the program of the microcontroller. It is worked out within a single oscillation of the carrier frequency. The calculation and the modulation are synchronized by the microprocessor.

The control structure and the direct analog/digital conversion according to this invention allow a relatively low-resolution A/D converter to produce a relatively high-resolution rotation word. An offset of the A/D converter does indeed manifest itself as an error in the angle b, but the rotation dimension c remains without offset. An error of the rotation dimension c is integrated into an angle error which is taken in by the controller and compensated out.

Since the A/D converter must only transmit the sine of the angle difference (b−a), the resolution region only needs to take up a portion of an entire revolution through 360° of the function generator and need only take into account the maximum dynamically occurring control variation. With an optimum control algorithm even with very large accelerations of 20,000 rad/sec$^2$ the control variation (b−a) is less than 1°. As a result of the small amount of resolution needed the internal 8-bit analog/digital converter of standard microcontroller construction is completely adequate to make up a 16-bit rotation speed word. Since there are only very small angular variations, the sine of the angular difference will be very close to the angular variation, b−a being approximately equal to sin (b−a). Thus very simple angular variations are interpolated which are smaller than the angular resolution of the carrier-frequency modulation. This information from the interpolation is lost in the production of a 16-bit rotation-rate word c, when the rotation rate c is derived from the angle b.

A 12-bit 90° sine table in the memory 5 is sufficient to produce a 16-bit rotation-rate word. This gives a 45-bit angular resolution of the modulation for one full 360° revolution. A 12-bit digital/analog converter is used for the amplitude modulation of the carrier frequency.

The following performance was obtained using a circuit according to this invention equipped with an industry-standard 8-bit microcontroller operating at 12 mHz:

| | |
|---|---|
| Carrier frequency | 6.25 kHz |
| Dead time | 80 microsec |
| Max. rotation rate | at least 6000 rev/min |
| Angular-position resolution | 14 bit (16,834 steps/rev) |
| Rotation-rate resolution | 16 bit (65,536 steps) |
| Resulting rotary adj. range | at least 30,000 |

The high rotation-rate resolution coupled with a very short dead time cannot be achieved by any prior-art system. In addition the circuit uses a small number of elements. Since only limited resolving analog/digital and digital/analog converters are needed, the entire system is quite inexpensive to manufacture.

The method of this invention works with a resolver as well as with a synchromotor. It is merely necessary to take into account the different stator winding arrangements when setting up the angular-function amplitude modulation. In addition when a higher carrier frequency and more than a 16-bit controller is used it is possible to further increase resolution and decrease measuring cycle.

We claim:

1. A method of determining angular position and rotation rate of a function generator having stator windings and rotor windings, the method comprising the steps of:

(a) amplitude modulating a carrier oscillation to form a sine signal and a cosine signal;

(b) feeding the sine signal and cosine signal to opposite stator windings and thereby inducing in the rotor winding an analog function-generator signal;
(c) demodulating the analog function-generator signal by analysis of its sign and converting its amplitude into a digital function-generator signal;
(d) deriving from the digital function-generator signal by means of an algorithm a digital rotation-rate signal;
(e) numerically integrating the digital rotation-rate signal to obtain an angular-position signal; and
(f) using the angular-position signal to modulate the carrier oscillation in step (a).

2. Apparatus for determining angular position and rotation rate of a function generator having stator windings and rotor windings, the apparatus comprising in combination:
(a) amplitude modulating means for amplitude modulating a carrier oscillation to form a sine signal and a cosine signal;
(b) sine feeding means and cosine feeding means for feeding the sine signal and cosine signal, respectively, to opposite stator windings and thereby inducing in the rotor winding an analog function-generator signal;
(c) demodulating means for demodulating the analog function-generator signal by analysis of its sign and converting its amplitude into a digital function-generator signal;
(d) deriving means for deriving the digital function-generator signal by means of algorithm a digital rotation-rate signal;
(e) numerical means for numerically integrating the digital rotation-rate signal to obtain an angular-position signal; and
(f) carrier means for using the angular-position signal to modulate the carrier oscillation in the amplitude modulating means.

3. The apparatus defined in claim 2 wherein a microcontroller with a constant memory forms the amplitude modulating means, the sine feeding means, the cosine feeding means, the demodulating means, the deriving means and the numerical means.

* * * * *